United States Patent
Rune

(10) Patent No.: US 9,769,700 B2
(45) Date of Patent: Sep. 19, 2017

(54) OVERLOAD CONTROL IN A COMMUNICATION NETWORK

(71) Applicant: Telefonaktiebolaget L M Ericsson (publ), Stockholm (SE)

(72) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 14/648,450

(22) PCT Filed: Dec. 4, 2012

(86) PCT No.: PCT/SE2012/051339
§ 371 (c)(1),
(2) Date: May 29, 2015

(87) PCT Pub. No.: WO2014/088479
PCT Pub. Date: Jun. 12, 2014

(65) Prior Publication Data
US 2015/0312798 A1    Oct. 29, 2015

(51) Int. Cl.
*H04W 28/02* (2009.01)
*H04W 72/12* (2009.01)
(Continued)

(52) U.S. Cl.
CPC ....... *H04W 28/0289* (2013.01); *H04L 1/0072* (2013.01); *H04W 4/005* (2013.01);
(Continued)

(58) Field of Classification Search
CPC .......... H04W 28/0289; H04W 74/002; H04W 28/02; H04W 72/12; H04W 4/005;
(Continued)

(56) References Cited

U.S. PATENT DOCUMENTS

2009/0201798 A1*  8/2009  Lee ................... H04W 74/0833
                                                370/216
2010/0232364 A1*  9/2010  Hsu ..................... H04W 74/085
                                                370/328
(Continued)

FOREIGN PATENT DOCUMENTS

EP       2 192 798       6/2010
WO       2014/084766     6/2014

OTHER PUBLICATIONS

3GPP TS 36.216 v11.0.0; Technical Specification; 3rd Generation Partnership Project; Technical Specification Group Radio Access Network; Evolved Universal Terrestrial Radio Access (E-UTRA); Physical layer for relaying operation (Release 11)—Sep. 2012.
(Continued)

*Primary Examiner* — Thai Nguyen
(74) *Attorney, Agent, or Firm* — Baker Botts, LLP

(57) ABSTRACT

Disclosed are methods as well radio network nodes and user equipments (UE) that are suitable for overload control in a communication network. A radio network node may, upon receiving a random access preamble from a UE, determine whether there exists a condition indicative of the radio network node having insufficient resources to respond properly to all random access preambles received by the radio network node. Also, in response to a determination that such condition exists, the radio network node may include in a MAC PDU, a request to extend the time period during which the UE waits for reception of a MAC RAR response. The radio network node may also transmit this MAC PDU including this request to the UE.

29 Claims, 4 Drawing Sheets

(51) Int. Cl.
    *H04L 1/00*     (2006.01)
    *H04W 74/00*     (2009.01)
    *H04W 4/00*     (2009.01)
    *H04W 74/08*     (2009.01)
    *H04W 72/00*     (2009.01)

(52) U.S. Cl.
    CPC ........... *H04W 28/02* (2013.01); *H04W 72/12* (2013.01); *H04W 74/002* (2013.01); *H04W 74/006* (2013.01); *H04W 74/0833* (2013.01); *H04W 72/00* (2013.01)

(58) Field of Classification Search
    CPC ........... H04W 74/006; H04W 74/0833; H04W 72/00; H04L 1/0072
    See application file for complete search history.

(56) References Cited

U.S. PATENT DOCUMENTS

| | | |
|---|---|---|
| 2010/0238859 A1 | 9/2010 | Vukovic et al. |
| 2012/0051297 A1 | 3/2012 | Lee et al. |
| 2012/0163169 A1 | 6/2012 | Yang et al. |
| 2013/0128733 A1* | 5/2013 | Lee ................... H04W 74/02 370/230 |

OTHER PUBLICATIONS

International Search Report for International application No. PCT/SE2012/051339, May 13, 2013.

3GPP TS 36.321 V10.5.0; 3rd Generation Partnership Project; Technical Specification Group Radio Access Network; Evolved Universal Terrestrial Radio Access (E-UTRA); Medium Access Control (MAC) protocol specification (Release 10), Mar. 2012.

3GPP TSG RAN WG2 #73bis; Barcelona, Spain; Title: Backoff enhancements for RAN overload control (R2-112863), May 9-13, 2011.

3GPP TSG-RAN WG2 #75; Athens, Greece; Title: Discussion on RAN Overload Solution (R2-114458), Aug. 22-26, 2011.

European Patent Office, Communication pursuant to Article 94(3) EPC, Application No. 12 799 667.6-1854, Dated Apr. 18, 2017, 5 pages.

* cited by examiner

OVERLOAD CONTROL IN A COMMUNICATION NETWORK

PRIORITY

This nonprovisional application is a U.S. National Stage Filing under 35 U.S.C. §371 of International Patent Application Serial No. PCT/SE2012/051339, filed Dec. 4, 2012, and entitled "Overload Control In A Communication Network."

TECHNICAL FIELD

Embodiments of the present invention presented herein generally relate to communication networks and, more particularly, to overload control in such networks.

BACKGROUND

Detailed descriptions of communication networks and systems can be found in literature, such as in Technical Specifications published by, e.g., the $3^{rd}$ Generation Partnership Project (3GPP). In such systems, user equipments (UE) can, e.g., access mobile services via an access network comprising a Radio Access Network (RAN) and a Core Network (CN). Examples of 3GPP-based communication networks include, for example, 2G GSM/GPRS (Global System for Mobile Communications/General Packet Radio Services), 3G UMTS (Universal Mobile Telecommunications System), and LTE (Long Term Evolution) EPS (Evolved Packet System). Examples of radio access networks (RAN) include GERAN (GSM/EDGE (Enhanced Data rates for GSM Evolution) RAN for 2G GSM/GPRS), UTRAN (Universal Terrestrial RAN for 3G UMTS), and E-UTRAN (Evolved UTRAN for LTE EPS). Examples of packet core networks include GPRS Core (for 2G and 3G) and Evolved Packet Core (for 2G, 3G UTRAN and E-UTRAN).

In communication systems, such as those mentioned above, a potential problem is that a number of UEs and/or other devices may simultaneously require communication network resources. This may induce a congestion or overload of network resources, which may potentially have serious consequences as the communication system may no longer be able to function properly or sufficiently well.

This problem of congestion or overload is becoming increasingly important in particular with the introduction in communication networks of Machine Type Communication (MTC), also sometimes referred to as Machine-to-Machine Communication (M2M), for example as currently specified by standardization bodies such as the 3GPP, see for example 3GPP TS 22.368 V.12.0.0 (2012-09). As is known among persons skilled in this art, MTC is a form of data communication which involves one or more MTC devices that do not necessarily involve human interaction. As is also known among persons skilled in this art, MTC devices are an example of a UE. In other words, MTC devices constitute a subset of the term UE.

With the introduction of MTC in communication systems such as those described hereinabove, the potentially large number of MTC devices and the nature of MTC may pose challenges on the communication networks. For example, access control signaling resources become particularly exposed in some scenarios. For example, some scenarios include MTC devices in the form of sensor devices which monitor states of technological systems (e.g. industrial systems) or processes or sensor devices monitoring various environmental conditions such as temperature, pressure and vibrations. For such MTC devices (and the applications where these MTC devices are utilized) external events such as power grid failure, a pipeline damage, an earthquake or an industrial process failure may trigger a large amount of MTC devices wanting to access the communication network simultaneously, or substantially simultaneously, for the purpose of reporting the triggering events to their respective application servers. When a large number of MTC devices require network resources simultaneously, or substantially simultaneously, there is an increased risk of congestion or overload in the communication network. In addition to the above example scenario seen with respect to MTC devices, overload may of course also be caused by non-MTC devices, e.g. UEs that do involve human interaction. Such non-MTC devices may e.g. include devices such as cellphones, smartphones, tablet computers, gaming devices, personal digital assistants (PDAs), etcetera. To sum up, when a large number of UEs and/or MTC devices require network resources simultaneously, or substantially simultaneously, there is an increased risk of congestion or overload in the communication network.

A known means for protecting the network access resources from overload in an LTE cell is known as the Access Class Barring (ACB) mechanism. For the purpose of this mechanism, each UE is a member of at least one Access Class (AC), which is stored in the USIM. An evolved NodeB (eNB) may announce the ACB state in each cell through the broadcast system information (SI). System Information Block Type 2 (SIB 2) of the SI lists the state of each AC through an Access Class Barring Factor (ACBF) associated with each AC, which has a value between 0 and 1. When a UE finds an AC in the SI which corresponds to one stored in the USIM, the UE generates a random value between 0 and 1. If the random value is lower than the ACBF of the concerned AC, the UE considers the cell as barred, i.e. it is not allowed to access it, for a random time period with a mean value governed by the Access Class Barring Time (ACBT) parameter included in the SI (in SIB 2). With the particular nature of MTC devices in mind the 3GPP is currently working on an extension of the ACB concept, called Extended Access Barring (EAB). EAB is a mechanism for the operator(s) to control mobile originating access attempts from UEs that are configured for EAB in order to prevent overload of the access network and/or the core network. In overload situations, the operator can restrict access from UEs configured for EAB while permitting access from other UEs.

Sometimes the ACB/EAB mechanism is not enough to protect a cell from overload. This may, for example, be because the mechanism is slow to react to changes due to the pressure on the network access resources (because it relies on the rather infrequently transmitted system information), e.g. during sudden surges of access attempts from MTC devices which are more or less synchronized for one reason or the other (as exemplified above). It may also be because the chosen ACB/EAB parameters were not appropriate to handle the number of access attempts or because ACB/EAB was not used at all.

Another method for access load control is known from the US patent application publication US 2012/0163169 A1, which was published on 28 Jun. 2012. This publication describes an overload control apparatus and method for a MTC type communication service. The method described in this document resembles the EAB method in that it attempts to proactively notify MTC devices of an overload state in order to make them refrain from access attempts. A difference from the earlier-described EAB method is that the method and apparatus of this disclosure use a MAC (Medium Access Control) subheader instead of the system information to carry the overload indications to the MTC devices. A concerned MTC device is required to check for possible overload indications before it attempts to access the network through the random access procedure. Hence, a MTC device which wants to access the network must first monitor the downlink until it receives a message including the MAC subheader triggered by a random access attempt from another UE, i.e. a UE different from the concerned UE. If the MAC subheader does not contain any overload indication, the MTC device is allowed to initate the random access procedure by transmitting a random access preamble to the base station. On the other hand, if the MAC subheader does include an overload indication, the MTC device waits a certain time until it sends the random access preamble. If applying a procedure as disclosed in this disclosure, the base station may potentially send out a large amount of messages irrespective of the overload situation. Thus, unecessarily much system resources may be consumed. Also, since MTC devices are supposed to check the overload situation before attempting to send their respective random access preambles, the overall procedure may become delayed in some situations. Potentially, the montoring and reception of the MAC subheaders may also mean an increased energy consumption of the UE.

SUMMARY

It is in view of the above considerations and others that the various embodiments of the present invention have been made.

There is still a need to provide overload control in communication systems, particularly (though not exclusively) for MTC communication. In view of this, it is therefore a general object of the various embodiments of the present invention to provide for an improved overload, or congestion, control.

The various embodiments of the present invention as set forth in the appended independent claims address this general object. The appended dependent claims represent additional advantageous embodiments of the present invention.

According to an aspect, there is provided method performed by a radio network node. The method comprises receiving a random access preamble from an unserved user equipment (UE); upon receiving the random access preamble, determining whether a condition indicative of the radio network node having insufficient resources to respond properly to all random access preambles received by the radio network node exists; and when it is determined that a condition indicative of the radio network node having insufficient resources to respond properly to all random access preambles received by the radio network node does exist, including, in a Medium Access Control (MAC) Protocol Data Unit (PDU) a request to extend the time period during which the unserved user equipment, UE, waits for reception of a MAC Random Access Response (RAR); and transmitting the MAC PDU including said request to the unserved UE.

The MAC PDU may comprise a MAC header including a Backoff Indicator subheader. Furthermore, the inclusion of the request may comprise including the request in one or more of the fields of the Backoff Indicator subheader. For instance, the Backoff Indicator subheader may comprise at least one (i.e. one or more) Reserved field. If so, the inclusion of the request may comprise including the request in one or more of the one or more Reserved fields of the Backoff Indicator subheader. In one embodiment, the Backoff Indicator subheader comprises at least one Reserved field and the inclusion of the request comprises including the request in only one of the at least one Reserved field of the Backoff Indicator subheader. For example, the Backoff Indicator subheader may comprise two Reserved fields and the inclusion of the request may comprise including the request in only one of the two Reserved fields of the Backoff Indicator subheader.

Advantageously, the inclusion of the request comprises altering the setting of the Reserved field(s) of the Backoff Indicator subheader to include a value representing said request.

In some embodiments, the step of receiving of the random access preamble comprises receiving the random access preamble on a Physical Random Access Channel (PRACH).

The method may additionally comprise transmitting at least one MAC RAR to the unserved UE when previously insufficient resources becomes available.

According to another aspect, there is provided a method performed by a user equipment (UE). The method comprises: transmitting a random access preamble to a radio network node; receiving a MAC PDU from the radio network node, the MAC PDU comprising a request to extend the time period during which the UE waits for reception of a MAC Random Access Response (RAR), from the radio network node; and in response thereto starting a timer and monitoring a Physical Downlink Control Channel (PDCCH) for reception of the MAC RAR until the timer has reached a maximum time limit, the maximum time limit corresponding to the extended time period.

The MAC PDU may comprise a MAC header including a Backoff Indicator subheader and one or more fields of the Backoff Indicator subheader may include said request. For instance, the Backoff Indicator subheader may comprise at least one Reserved field and one or more of the at least one Reserved field of the Backoff Indicator subheader may include said request. In one embodiment, the Backoff Indicator subheader comprises at least one Reserved field and only one of the at least one Reserved field of the Backoff Indicator subheader includes said request. For example, the Backoff Indicator subheader may comprise two Reserved fields, wherein only one of the Reserved fields of the Backoff Indicator subheader includes said request. Advantageously, the Reserved field(s) of the Backoff Indicator subheader is/are set to a value representing said request.

In one embodiment, the method comprises transmitting the random access on a Physical Random Access Channel (PRACH).

According to yet another aspect, there is provided a radio network node. The radio network node comprises a receiver, a transmitter, a processor, and a memory. The receiver may be configured to receive a random access preamble from an unserved UE. Furthermore, the memory may store computer program code, which, when run in the processor causes the radio network node to: determine, upon receiving the random access preamble, whether a condition indicative of the radio network node having insufficient resources to respond properly to all random access preambles received by the radio network node exists; and when it is determined that a condition indicative of the radio network node having insufficient resources to respond properly to all random access preambles received by the radio network node does exist, including, in a Medium Access Control (MAC) Protocol Data Unit (PDU) a request to extend the time period during which the unserved user equipment, UE, waits for reception of a MAC Random Access Response, RAR; and transmit, via the transmitter, the MAC PDU including said request to the unserved UE.

In one embodiment, the MAC PDU comprises a MAC header including a Backoff Indicator subheader and the memory and the computer program code are configured to, with the processor, cause the radio network node to include the request in one or more of the fields of the Backoff Indicator subheader.

In one embodiment, the Backoff Indicator subheader comprises at least one Reserved field and wherein the memory and the computer program code are configured to, with the processor, cause the radio network node to include the request in one or more of the at least one Reserved field of the Backoff Indicator subheader.

In an example embodiment, the Backoff Indicator subheader comprises at least one Reserved field and the memory and the computer program code are configured to, with the processor, cause the radio network node to include the request in only one of the at least one Reserved field of the Backoff Indicator subheader. For example, the Backoff Indicator subheader can comprise two Reserved fields and the memory and the computer program code can be configured to, with the processor, cause the radio network node to include the request in only one of the Reserved fields of the Backoff Indicator subheader.

Advantageously, the memory and the computer program code are configured to, with the processor, cause the radio network node to alter the setting of the Reserved field of the Backoff Indicator subheader to include a value representing said request.

In one embodiment, the receiver is configured to receive the random access preamble from the unserved UE on a Physical Random Access Channel, (PRACH).

In one embodiment, the transmitter is configured to transmit at least one MAC RAR to the unserved UE when previously insufficient resources becomes available.

According to still another aspect, there is provided a user equipment (UE). The UE comprises: a transmitter configured to transmit, to a radio network node, a random access preamble; and a receiver configured to receive a MAC PDU from the radio network node, the MAC PDU comprising a MAC header including a request to extend the time period during which the UE waits for reception of a MAC Random Access Response (RAR) from the radio network node. Moreover, the UE comprises a processor; and a memory storing computer program code, which, when run in the processor, causes the UE (after reception of said request) to start a timer and monitor a Physical Downlink Control Channel, PDCCH for reception, via the receiver, of the MAC RAR until the timer has reached a maximum time limit, the maximum time limit corresponding to the extended time period.

The MAC PDU may comprise a MAC header including a Backoff Indicator subheader and one or more fields of the Backoff Indicator subheader may include said request. The Backoff Indicator subheader may, for instance, comprise at least one Reserved field and one or more of the at least one Reserved field of the Backoff Indicator subheader may include said request. In one embodiment, the Backoff Indicator subheader comprises at least one Reserved field and only one of the at least one Reserved field of the Backoff Indicator subheader includes said request. For example, the Backoff Indicator subheader may comprise two Reserved fields and only one of the Reserved fields of the Backoff Indicator subheader may include said request. Advanta- geously, the Reserved field(s) of the Backoff Indicator subheader is/are set to a value representing said request.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1A:
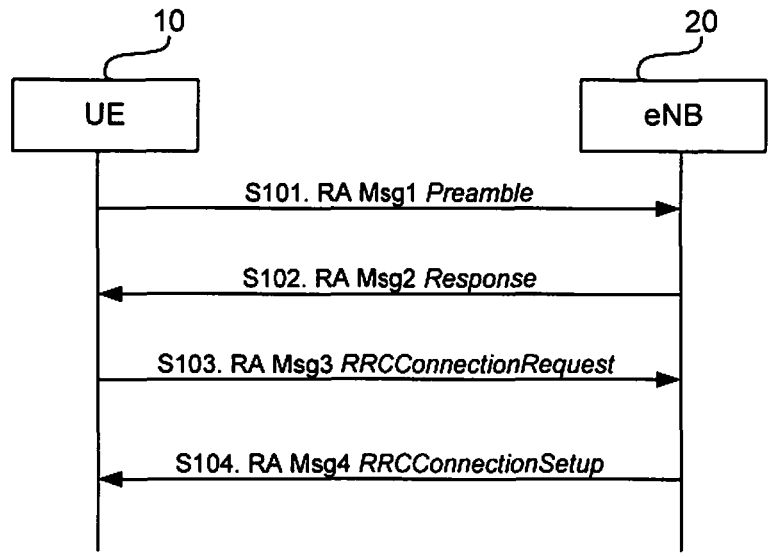
FIGS. 1a and 1b illustrate example random access procedures.

FIG. 1a illustrates an example random access procedure of a UE in a 3GPP LTE communication system. As a process for a user equipment, UE, to be attached to a communication network, a random access procedure is performed in the cases of initial attachment, handover, scheduling request, uplink time synchronization, to establish a Radio Resource Control (RRC) connection (i.e. transition from the RRC-IDLE to the RRC-CONNECTED state), and so forth. In other words, UEs perform random access for initial attachment and data transmission.

As used in the following the term "UE" is any device, which can be used by a user to communicate. Also, the term UE may be referred to as a mobile terminal, a terminal, a user terminal (UT), a wireless terminal, a wireless communication device, a wireless transmit/receive unit (WTRU), mobile phone, cell phone, etc. Yet further, the term UE includes MTC devices, which do not necessarily involve human interaction.

The term "radio network node" as used herein generally denotes a fixed point being capable of communicating with the UE. As such, it may be referred to as a base station, a NodeB or an evolved NodeB (eNB), access point, etcetera.

Referring to the random access procedure illustrated in FIG. 1a, an example random access procedure involving a transition from RRC-IDLE to RRC-CONNECTED state is shown. A UE 10 selects a random access preamble and transmits S101 the selected random access preamble RA Msg1 to the radio network node 20, e.g., on the Physical Random Access Channel (PRACH).

Subsequently, the radio network node 20 transmits S102 a random access response (RAR) RA Msg2 to the UE 10.

Figure 2:
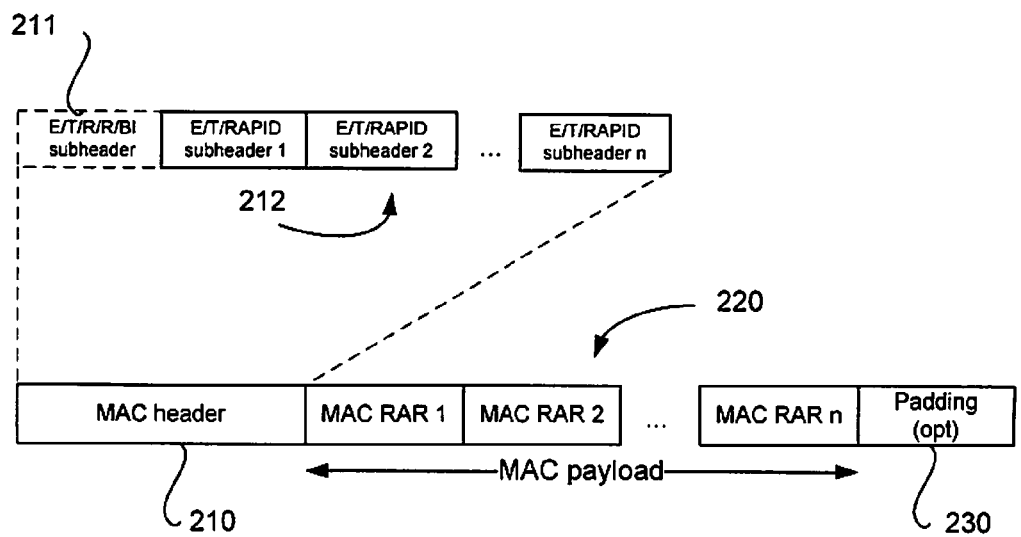
FIG. 2 shows an example constitution, or format, of a MAC PDU.

With reference to FIG. 2, an example of a RAR message (i.e. RA Msg2 transmitted S102 from the radio network node 20 to the UE 10) is shown. A medium access control (MAC) protocol data unit (PDU) format as defined in *Technical Specification* 3GPP TS 36.321 V.11.0.0 (2012-09) and as exemplified in FIG. 2 comprises a MAC header 210 and zero, one or more MAC RARs 220. The MAC RARs 220 are so-called payload fields. Optionally, a padding field 230 can be included. The MAC header 210 has a variable length and includes at least one MAC subheader 211, 212. Each subheader 212 except a Backoff (BI) indicator subheader 211 corresponds to one MAC RAR. If included, the BI subheader 211 may be the first subheader included within the MAC header 210.

Figure 3:
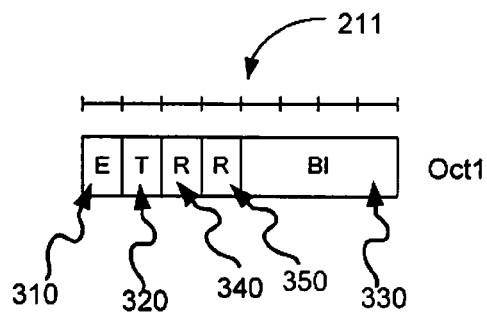
FIG. 3 shows an example constitution, or format, of a MAC subheader of FIG. 2.

Referring to FIG. 3, the subheader denoted 211 shown in FIG. 2 may comprise five header fields 310-350. In this example embodiment, there is an E field 310 of one bit, a T field 320 of one bit, a BI field 330 of four bits, and two reserved (R) fields 340, 350 of one bit each. In general, such a structure is referred to as an E/T/R/R/BI format, or structure. Sometimes, such a structure is called a Backoff Indicator subheader. Here, the E field 310 may be an extension field indicating whether or not an additional field is comprised in the MAC header 210. For example, where the E field 310 is set to 1, there may exist follow-up E/T/RAPID (Random Access Preamble IDentifier) fields 212. Where the E field 310 is set to 0, MAC RARs 220 or padding 230 may be started from the next byte. The T field 320 is a type flag indicating whether or not the MAC subheader 212 has an access ID (i.e. is a RAPID sub header corresponding to a MAC RAR) or BI. In a general message, 0 may be used as an R field. In other words, a general UE 10 may perform a procedure irrespective of the R fields included in the RAR message.

Turning back to FIG. 2, the MAC subheaders denoted 212 may comprise three header fields, i.e. an E field of one bit, a T field of one bit and a RAPID field of six bits. Here, the RAPID field indicates identification (ID) of a transmitted RAR. In general, such a structure is referred to as an E/T/RAPID structure.

Furthermore, a MAC RAR 220 generally comprises four fields, as defined in *Technical Specification* 3GPP TS 36.321 V.11.0.0 (2012-09). As exemplified in 3GPP TS 36.321 V.11.0.0 (2012-09), each MAC RAR may comprise six octets, each octet comprising eight bits. A first field may be a reserved (R) field of one bit. A second field may be a Timing Advance Command field of, e.g., eleven bits. A third field may comprise an uplink (UL) grant field. The third field may be of e.g. 20 bits. Finally, a fourth field may comprise the Temporary C-RNTI (Cell Radio Network Temporary Identifier). The fourth field 340 may be of 16 bits.

Referring again to FIG. 1a, when the UE 10 successfully receives a response message, RA Msg 2, from the radio network node 20 (i.e. in response to the random access preamble sent in RA Msg 1), the UE 10 transmits S103 RA Msg3 including a UE identifier (ID) to the radio network node 20. When doing so, the UE 10 may use radio resources which have been allocated to the UE 10 by the radio network node 20, as is well-known among persons skilled in the art. The RA Msg 3 is sometimes referred to as a RRCConnectionRequest message. Subsequently, the radio network node 20 receiving the RA Msg 3 transmits S104 a RA Msg 4 to complete, or conclude, the contention resolution. This RA Msg4 is sometimes referred to as a RRCConnectionSetup message. Consequently, the UE 10 receives S104 the contention resolution message RA Msg 4. The random access procedure is completed when the UE 10 receives S104 the contention resolution message RA Msg 4.

Figure 1B:
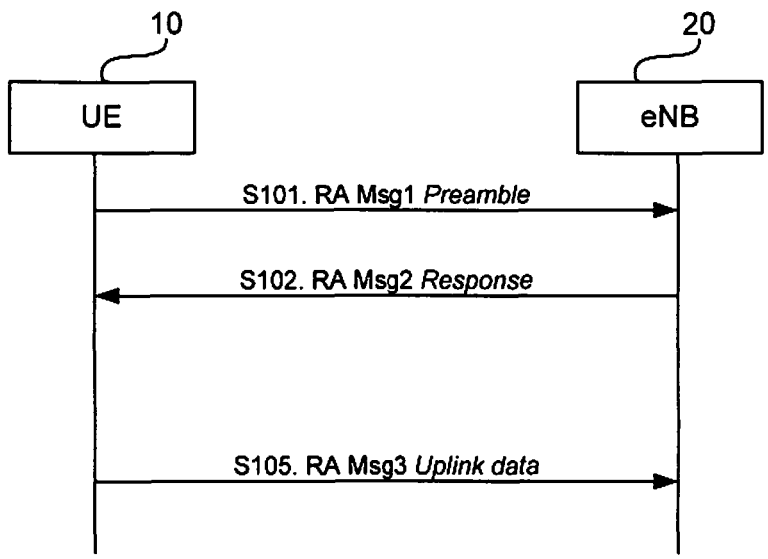

Random access procedures are also used in other scenarios, i.e. scenarios that are different from the above-described scenario with respect to FIG. 1a. For example, another scenario is when the UE is already in the RRC-Connected state, but lack uplink synchronization (e.g. lacks a valid timing advance). An example of such procedure is illustrated in FIG. 1b. As can be seen, this method is comparatively shorter than the method illustrated in FIG. 1a. Steps S101 and S102 are the same or substantially the same as steps S101 and S102 of FIG. 1a and will therefore not be further detailed here. Compared with the example procedure in FIG. 1a, the RA Msg4 can be omitted in the procedure of FIG. 1b. Also, compared to the procedure of FIG. 1a, the RA Msg3 is different. In the procedure of FIG. 1b, the UE 10 can transmit (to the radio network node 20) a RA Msg3 which includes a C-RNTI (Cell Radio Network Temporary Identifier). The RA Msg 3 may e.g. be transmitted on a Physical Uplink Shared Channel (PUSCH). Optionally, the RA Msg3 may additionally include a buffer status report (BSR) and/or user data. Whether or not a BSR and/or user data is included may, for example, be determined in dependence on whether there is room available in the allocated transmission resources. As a mere example, whether or not the RA Msg3 includes a BSR and/or user data may, be determined by the following rule: If all user data can be fit into a transport block, then inclusion of user data has priority over BSR, but if not all user data can be fit into the transport block, then the BSR has priority over the user data.

While FIG. 1a and FIG. 1b show two example random access procedures according to two different scenarios, other scenarios and thus random access procedures can also be conceivable. Therefore, the herein detailed embodiments of the invention should not be limited to the above two scenarios.

Figure 4:
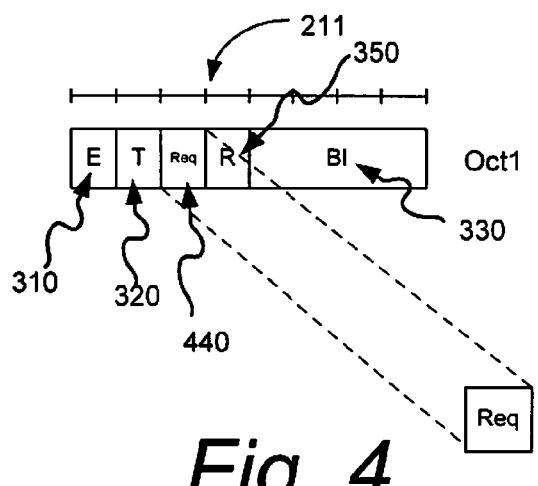
FIG. 4 shows a constitution, or format, of a MAC subheader according to an example embodiment.
Figure 5A:
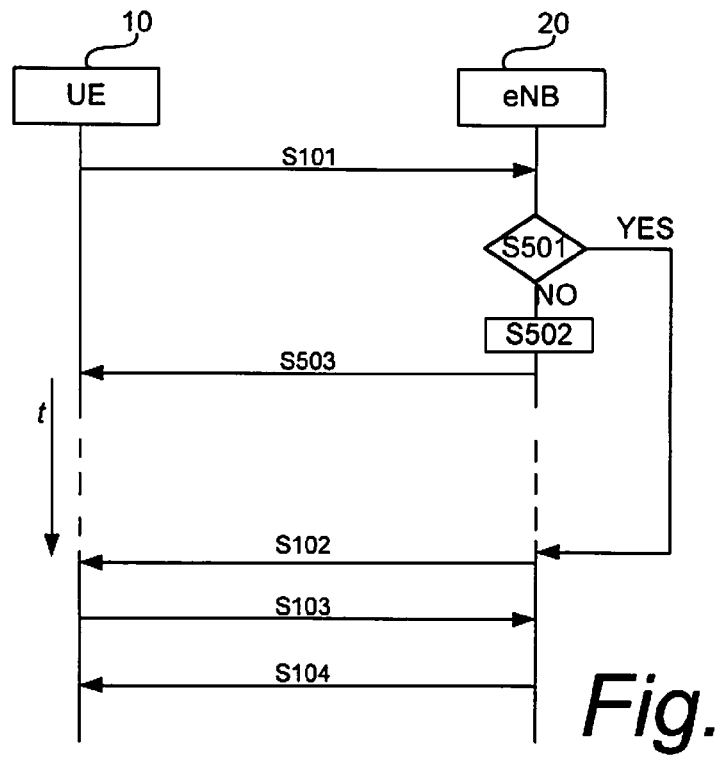
FIGS. 5a and 5b show signaling diagrams, or flow charts, of example embodiments of the invention.
Figure 5B:
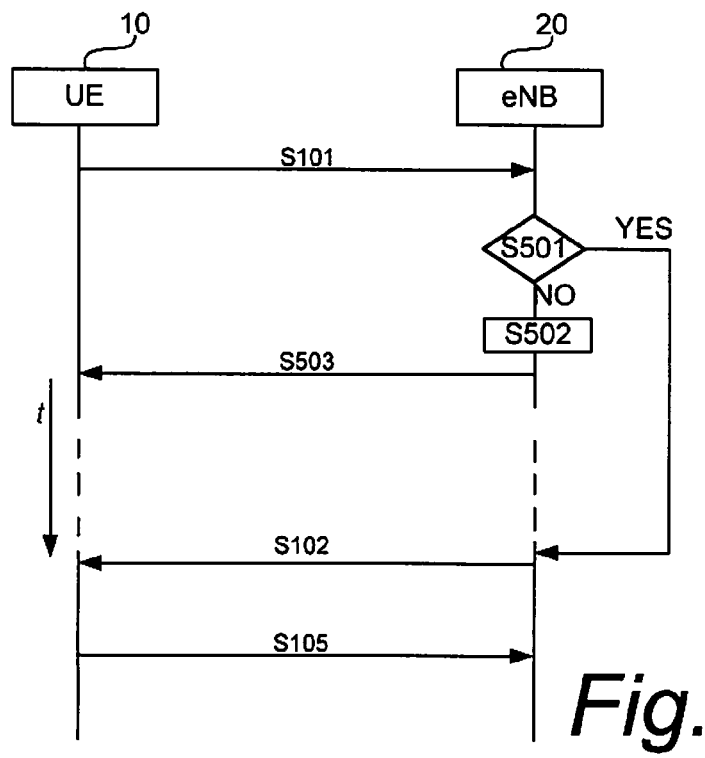

An example embodiment of the present invention will now be described with reference to FIGS. 4 and 5. FIG. 4 shows a format of a MAC PDU including a request in accordance with this example embodiment. FIGS. 5a and 5b illustrate a signaling diagram, or flow charts, of the example procedures.

An unserved UE 10, i.e. a UE that is not yet served by the radio network node 20, transmits S101 a random access preamble, e.g. on a PRACH channel, to a radio network node 20, here exemplified by an eNB. The radio network node 20 thus receives S101 the random access preamble from the UE 10.

Upon receiving S101 the random access preamble from the UE 10, the radio network node 20 determines S501 whether a condition indicative of the radio network node having insufficient resources to respond properly to all random access preambles received by the radio network node 20 exists. To this end, the radio network node 20 is configured to monitor its resource situation, i.e. its available resources. The resources may e.g. include transmission resources, processing resources or both transmission resources and processing resources. Transmission resources may, e.g., include transmission resources for transmission of a Random Access Response MAC PDU and/or transmission resources to be allocated for subsequent uplink (UL) transmissions, such as transmission of RA Msg3 (see FIG. 1b). Processing resources may, e.g., include processing resources for preparing and transmitting the Random Access Response MAC PDU and/or processing resources for scheduling of transmission resources to be allocated for subsequent uplink transmission of RA Msg3 (see FIG. 1b). In some example implementations, a component such as a scheduler (sometimes referred to as scheduling unit or scheduling function) of the radio network node 20 may be configured to monitor the transmission resources the radio network node 20 has allocated. Also, the scheduler of the radio network node 20 may be configured to monitor pending downlink data in scheduling queues, outstanding (i.e. received but not yet responded to) scheduling requests, random access preambles and/or buffer status reports, etc. Consequently, the radio network node 20 may rather accurately predict the availability of current, thus available, transmission resources and other resources.

Thus, the radio network node 20 determines S501 whether the radio network node 20 in question has enough transmission resources, processing resources and/or both transmission resources and processing resources available to be able to respond properly to all random access preambles received by the radio network node 20. The determination S501 may be performed immediately, or substantially immediately, upon receiving S101 the random access preamble. Alternatively, the determination may be performed within or after a pre-defined time period, which may e.g. 5, 7, 9, 11 or 13 seconds after receiving S101 the random access preamble.

If, or when, the radio network node 20 determines S501 (i.e. "YES" in FIG. 5a and FIG. 5b) that there exist resources to respond properly to all random access preambles received by the radio network node, the method can directly continue to steps S102-S104. These steps are the same or substantially the same as the steps S102-S104 described earlier with respect to FIG. 1a and will therefore not be repeated here. Alternatively, the method continues directly to steps S102-S105. The steps are the same or substantially the same as the steps S102-S105 described earlier with respect to FIG. 1b and will therefore not be repeated here.

However, if or when it is determined S501 that the radio network node 20 does have insufficient resources (i.e. there are not sufficient resources) to respond properly to all random access preambles received by the radio network node 20 (i.e. "NO" in FIGS. 5a and 5b), the radio network node 20 continues by including S502 a request in a Medium Access Control (MAC) Protocol Data Unit (PDU). More specifically, the request input in the MAC PDU is a request to extend the time period during which the UE 10 waits for reception of a MAC Random Access Response (RAR).

With reference to FIG. 4, a MAC PDU is exemplified to include a subheader 211 (see also FIG. 2). In this example embodiment, the request is included in one of the fields of the subheader 211. More particularly, the request is included in one of the Reserved fields (R) (here in the field denoted 440) of the Backoff Indicator subheader 211. It may be advantageous to use only one of the two Reserved fields for inclusion of the request, because this facilitates backward compatibility among UEs as the length of the subheader can be kept unchanged. Moreover, utilizing only one of the Reserved fields provides for a non-complex solution.

In one embodiment, the inclusion of the request comprises merely altering the setting of the Reserved field 440 of the Backoff Indicator subheader 211 to include a value representing said request. The Reserved fields are normally set to 0. According to this example embodiment, one of the Reserved fields 440 is altered to 1. In other words, altering the setting of one of the Reserved fields (from 0 to 1) can be used to represent the request, i.e. the request to extend the time period during which the UE 10 waits for reception of a MAC Random Access Response (RAR). This way, that the Reserved field bit value is altered from 0 to 1 functions as an indication to the UE 10 that the radio network node 20 has insufficient resources to respond properly to all random access preambles received by the radio network node 20. Generally, served UEs ignore the backoff indicator subheader 211 and consequently only those UEs that are unserved will interpret the altered Reserved field as carrying information. This makes this example embodiment advantageous as it adds no, or little, complexity to already available solutions.

In an alternative embodiment, the Backoff Indicator subheader 211 may comprise only one Reserved field (R). In such alternative embodiment, it would be advantageous to use the, thus, only Reserved field for inclusion of the above-described request.

When the request has been included S502 in the MAC PDU, such as in the backoff indicator subheader 211, the MAC PDU including this request is transmitted S503 to the unserved UE 10 that transmitted S101 the random access preamble previously. Consequently, this UE 10 receives S503 a MAC PDU from the radio network node 20, wherein the MAC PDU comprises the earlier-mentioned request to extend the time period during which the UE waits for reception of a MAC RAR from the radio network node 20. Thus, the UE 10 will be informed by the radio network node 20 that the radio network node 20 currently did not have sufficient, i.e. enough, capacity (be it transmission resources, processing resources or both). Also, the received MAC PDU (e.g. one of the Reserve field(s) of the MAC subheader 211) comprises or constitutes the request to the UE to extend the time period during which the UE 10 waits for reception of a MAC RAR from the radio network node 20 (because the radio network node 20 will subsequently, i.e. after a certain period of time t send one or more MAC RARs for the yet unserved UE 10).

It may not be necessary to specify an explicit length of the time period in the MAC PDU, which is sent to the UE 10. Instead, it may be conceivable to use a fixed, thus pre-defined, length of the time period. This fixed length of the time period may be known to the UE 10 in advance. For example, the fixed time length could be standardized, e.g. by hard coding into UEs 10. Alternatively, it could be provided to the UE through USIM (Universal Subscriber Identity Module) configuration. Yet further, it could be possible to provide this information via system information transmissions.

The yet unserved UE 10 will, in response to receiving S503 the MAC PDU including the earlier-mentioned request, start a timer and begin monitoring a Physical Downlink Control Channel (PDCCH) for reception of the MAC RAR until the timer has reached a maximum time limit t. The maximum time limit corresponds to the earlier-mentioned extended time period. More particularly, the MAC RAR may be transmitted on a Physical Downlink Shared Channel (PDSCH) indicated by a downlink resources assignment addresses to a Random Access RNTI (RA-RNTI) on the PDCCH. Thus, the UE 10 monitors the PDCCH.

If or when previously insufficient resources becomes available, e.g. when the radio network node 20 determines that it has sufficient resources available, the radio network node 20 can transmit S102 at least one MAC RAR to the yet unserved UE. The method can then continue to steps S103-S104. The steps S103-S104 are the same or substantially the same as the steps S103-S104 described earlier with respect to FIG. 1a and will therefore not be repeated here. Alternatively, the method may continue to S105. The step S105 is the same or substantially the same as the step S105 described earlier with respect to FIG. 1*b* and will therefore not be repeated here. When insufficient resources becomes available (i.e. when the resources becomes sufficient) can be determined by the radio network node 20 continuously. Alternatively, this can be determined at pre-defined intervals. For example, the earlier-mentioned scheduler (or a scheduler function) of the radio network node 20 may monitor the resource situation of the radio network node 20 either continuously or at pre-defined intervals.

Figure 6:
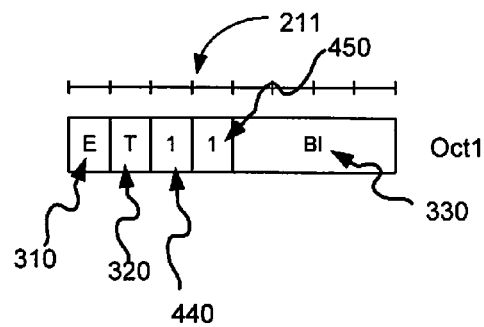
FIG. 6 shows a constitution, or format, of a MAC subheader according to another example embodiment.

Turning now to FIG. 6, an alternative embodiment is illustrated. In this example embodiment, two fields 440, 450 of the E/T/R/R/BI structure are utilized. More particularly, the two Reserved Fields 440 and 450 are utilized. Yet further, in this example embodiment the values of the two Reserved fields are utilized to indicate the request to extend the time period during which the unserved UE should wait for reception of the MAC RAR message. For example, the values of the two Reserved fields may indicate three different time periods. That is, a bit value "01" represents one time period. The illustrated bit value "11" represents another time period. The bit value "10" represents yet another time period and finally the bit value "00" may indicate still another time period. The above four time periods may be predefined. The exact length of the time periods may be tested and evaluated in each specific case. However, it may be advantageous if these time periods are standardized, e.g. by hard coding into UEs 10, so that the UEs can interpret the received bit values of the two Reserved field in a correct manner. Alternatively, the translation of the bit values into time lengths could be configured by information in, e.g., the system information that is broadcast in the radio cell(s) or it could be configured in the USIM.

Figure 7:
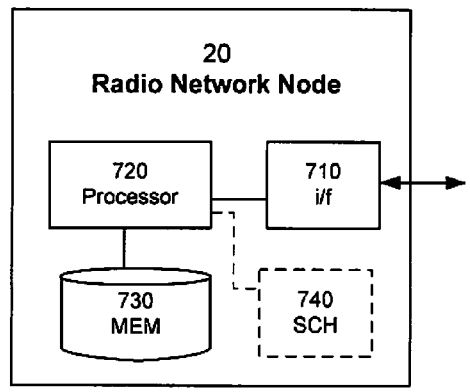
FIG. 7 shows an example embodiment of a radio network node such as a eNB.

Turning now to FIG. 7, a radio network node 20 according to an example embodiment will be described. The radio network node, which may for example be an evolved NodeB, comprises a communication interface 710, a processor 720 and memory 730. In this example embodiment, the communication interface 710 comprises a receiver and a transmitter. In alternative embodiments, the receiver and transmitter functionalities are combined into one single unit, a transceiver. The receiver 710 is configured to receive a random access preamble from an unserved UE, e.g. on a PRACH channel. Also, the memory 730 stores computer program code, which when run in the processor 720 causes the radio network node 20 to: determine, upon receiving the random access preamble, whether a condition indicative of the radio network node having insufficient resources to respond properly to all random access preambles received by the radio network node exists; and when it is determined that a condition indicative of the radio network node having insufficient resources to respond properly to all random access preambles received by the radio network node does exist, including, in a MAC PDU, a request to extend the time period during which the unserved user equipment, UE, waits for reception of a MAC RAR message; and transmit, via the transmitter 710, the MAC PDU including said request to the unserved UE.

As described hereinabove, the radio network node 20 is configured to determine whether there exists a condition indicative of the radio network node having insufficient resources to respond properly to all random access preambles received by the radio network node. To this end, the radio network node 20 may be configured to monitor its resource situation, i.e. its available resources. These resources may relate to transmission resources, processing resources or both. In one embodiment, the memory 730 and the computer program code may be configured to, with the processor 720, cause the radio network node 20 to monitor its resource situation, i.e. its available resources. In another example implementation, the radio network node may alternatively comprise a scheduler 740, which is in charge of the monitoring of the available resources as described earlier.

In one advantageous embodiment, the MAC PDU comprises a MAC header including a Backoff Indicator subheader. The memory 730 and the computer program code may be configured to, with the processor 720, cause the radio network node 20 to include the request in one or more of the fields of the Backoff Indicator subheader. For example, the Backoff Indicator subheader may comprise two Reserved fields. If so, the memory 730 and the computer program code may be configured to, with the processor 720, cause the radio network node 20 to include the request in only one of the Reserved fields of the Backoff Indicator subheader. In one embodiment, the memory 730 and the computer program code are configured to, with the processor 720, cause the radio network node 20 to alter the setting of the Reserved field of the Backoff Indicator subheader to include a value representing said request.

The transmitter 710 may also be configured to transmit at least one MAC RAR to the unserved UE when previously insufficient resources become available.

Figure 8:
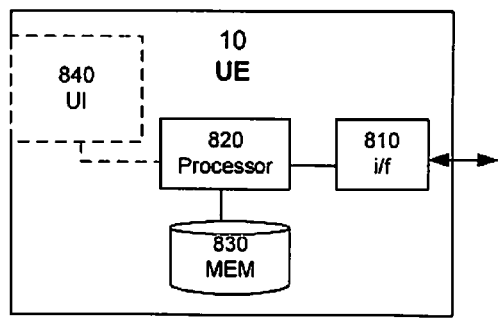
FIG. 8 shows an example embodiment of a UE.

FIG. 8 illustrates a user equipment, UE 10. In this example embodiment, the UE 10 comprises a communication interface 810, a processor 820, a memory 830 and optionally a user interface 840 through which a user can operate and interact with the UE 10. In this example embodiment, the communication interface 810 comprises a receiver and a transmitter. In alternative embodiments, the receiver and transmitter functionalities are combined into one single unit, a transceiver. The transmitter 810 is configured to transmit, to a radio network node 20, a random access preamble (e.g. on a PRACH channel). The receiver 810 is configured to receive a MAC PDU from the radio network node 20. This MAC PDU comprises a MAC header including a request to extend the time period during which the UE waits for reception of a MAC RAR message from the radio network node 20. The memory 830 is configured to store computer program code, which, when run in the processor 820 causes the UE 10 to, after reception of said request, start a timer and monitor a PDCCH channel for reception, via the receiver 810, of the MAC RAR message until the timer has reached a maximum time limit. This maximum time limit corresponds to the extended time period. Again, the MAC RAR may be transmitted on a Physical Downlink Shared Channel (PDSCH) indicated by a downlink resources assignment addresses to a Random Access RNTI (RA-RNTI) on the PDCCH. The MAC PDU may comprise a MAC header including a Backoff Indicator subheader one or more fields of the Backoff Indicator subheader may include said request. Yet further, the Backoff Indicator subheader may comprise at least two Reserved field and only one of the Reserved fields of the Backoff Indicator subheader may include said request. In one embodiment, the Reserved field of the Backoff Indicator subheader is set to a value representing said request.

According to the various embodiments disclosed throughout this disclosure, the inventors propose to include a request (to unserved UEs) in a MAC PDU. This request requests the unserved UE to extend the time period during which it waits for reception of a MAC RAR message when it has been determined by the radio network node that it does not have sufficient resources. This way, in situations where a radio network node 20 does not currently have sufficient resources, the UE can be informed about this and be instructed (requested) to wait for a somewhat longer time until resources are again sufficient to serve the yet unserved UE. Some embodiments disclosed herein can therefore provide for an improved overload control mechanism, which is capable of reacting relatively quickly to changes in a network overload situation. Some embodiments disclosed herein may allow for UEs and radio network nodes to utilize their respective resources more efficiently. For example, once previously insufficient resources become available, these resources can be utilized more efficiently and/or more quickly. According to some embodiments, the UE's network access is not delayed unnecessarily much. Moreover, some embodiments described herein are advantageous because these may reduce, or minimize, the energy consumption of UEs (that would otherwise result from UEs re-attempting network access in overload situations). Some of the embodiments disclosed herein are particularly (though not exclusively) appealing with the introduction of MTC type communication in 3GPP-based communication networks. More specifically, the embodiments disclosed herein may be interesting in scenarios where many UEs and/or other devices try to access a communication network simultaneously, or substantially simultaneously. Yet further, some of the embodiments described throughout this disclosure are backwards compatible, which may also be advantageous because this add little complexity to already available solutions.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. Rather, the invention is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a radio network node for overload control in a communication network, the method comprising:
   receiving a random access preamble from a user equipment (UE);
   upon receiving the random access preamble, determining whether a condition indicative of the radio network node having insufficient resources to respond properly to all random access preambles received by the radio network node exists; and when it is determined that a condition indicative of the radio network node having insufficient resources to respond properly to all random access preambles received by the radio network node does exist,
   including, in a Medium Access Control (MAC), Protocol Data Unit (PDU), a request to extend the time period during which the UE waits for reception of a MAC Random Access Response (RAR); and
   transmitting the MAC PDU including the request to the UE.

2. The method according to claim 1, wherein the MAC PDU comprises a MAC header including a Backoff Indicator subheader and wherein the including of the request comprises including the request in one or more of the fields of the Backoff Indicator subheader.

3. The method according to claim 2, wherein the Backoff Indicator subheader comprises at least one Reserved field and wherein the including of the request comprises including the request in one or more of the at least one Reserved field of the Backoff Indicator subheader.

4. The method according to claim 3, wherein the Backoff Indicator subheader comprises at least one Reserved field and wherein the including of the request comprises including the request in only one of the at least one Reserved field of the Backoff Indicator subheader.

5. The method according to claim 4, wherein the Backoff Indicator subheader comprises two Reserved fields and wherein the including of the request comprises including the request in only one of the two Reserved fields of the Backoff Indicator subheader.

6. The method according to claim 5, wherein the including of the request comprises altering the setting of the Reserved field of the Backoff Indicator subheader to include a value representing said request.

7. The method claim 1, wherein receiving of the random access preamble comprises receiving the random access preamble on a Physical Random Access Channel (PRACH).

8. The method according to claim 1, further comprising: transmitting at least one MAC RAR to the UE when previously insufficient resources becomes available.

9. A method performed by a user equipment (UE) the method comprising:
   transmitting a random access preamble to a radio network node;
   receiving a Medium Access Control (MAC) Protocol Data Unit (PDU) from the radio network node, the MAC PDU comprising a request to extend the time period during which the UE waits for reception of a MAC Random Access Response (RAR), from the radio network node; and in response thereto:
   starting a timer and monitoring a Physical Downlink Control Channel (PDCCH), for reception of the MAC RAR until the timer has reached a maximum time limit, the maximum time limit corresponding to the extended time period.

10. The method according to claim 9, wherein the MAC PDU comprises a MAC header including a Backoff Indicator subheader and wherein one or more fields of the Backoff Indicator subheader includes said request.

11. The method according to claim 10, wherein the Backoff Indicator subheader comprises at least one Reserved field and wherein one or more of the at least one Reserved field of the Backoff Indicator subheader includes said request.

12. The method according to claim 11, wherein the Backoff Indicator subheader comprises at least one Reserved field and wherein only one of the at least one Reserved field of the Backoff Indicator subheader includes said request.

13. The method according to claim 12, wherein the Backoff Indicator subheader comprises two Reserved fields and wherein only one of the Reserved fields of the Backoff Indicator subheader includes said request.

14. The method according to claim 13, wherein the Reserved field of the Backoff Indicator subheader is set to a value representing said request.

15. The method according to claim 9, wherein transmitting of the random access preamble comprises transmitting the random access preamble on a Physical Random Access Channel, PRACH.

16. A radio network node comprising:
   a receiver configured to receive a random access preamble from a user equipment (UE);
   a transmitter;
   a processor; and
   a memory storing computer program code, which, when run in the processor causes the radio network node to:
      determine, upon receiving the random access preamble, whether a condition indicative of the radio network node having insufficient resources to respond properly to all random access preambles received by the radio network node exists; and when it is determined that a condition indicative of the radio network node having insufficient resources to respond properly to all random access preambles received by the radio network node does exist,
      including, in a Medium Access Control (MAC) Protocol Data Unit (PDU), a request to extend the time period during which the UE waits for reception of a MAC Random Access Response (RAR); and
      transmit, via the transmitter, the MAC PDU including the request to the UE.

17. The radio network node according to claim 16, wherein the MAC PDU comprises a MAC header including a Backoff Indicator subheader and wherein the memory and the computer program code are configured to, with the processor, cause the radio network node to include the request in one or more of the fields of the Backoff Indicator subheader.

18. The radio network node according to claim 17, wherein the Backoff Indicator subheader comprises at least one Reserved field and wherein the memory and the computer program code are configured to, with the processor, cause the radio network node to include the request in one or more of the at least one Reserved field of the Backoff Indicator subheader.

19. The radio network node according to claim 18, wherein the Backoff Indicator subheader comprises at least one Reserved field and wherein the memory and the computer program code are configured to, with the processor, cause the radio network node to include the request in only one of the at least one Reserved field of the Backoff Indicator subheader.

20. The radio network node according to claim 19, wherein the Backoff Indicator subheader comprises two Reserved fields and wherein the memory and the computer program code are configured to, with the processor, cause the radio network node to include the request in only one of the Reserved fields of the Backoff Indicator subheader.

21. The radio network node according to claim 20, wherein the memory and the computer program code are configured to, with the processor, cause the radio network node to alter the setting of the Reserved field of the Backoff Indicator subheader to include a value representing said request.

22. The radio network node according to claim 16, wherein the receiver is configured to receive the random access preamble from the UE on a Physical Random Access Channel (PRACH).

23. The radio network node according to claim 16, wherein the transmitter is configured to transmit at least one MAC RAR to the UE when previously insufficient resources becomes available.

24. A user equipment (UE) comprising:
   a transmitter configured to transmit, to a radio network node, a random access preamble;
   a receiver configured to receive a Medium Access Control (MAC) Protocol Data Unit (PDU) from the radio network node, the MAC PDU comprising a MAC header including a request to extend the time period during which the UE waits for reception of a MAC Random Access Response (RAR) from the radio network node;
   a processor; and
   a memory storing computer program code, which, when run in the processor causes the UE to, after reception of the request:
      start a timer and monitor a Physical Downlink Control Channel (PDCCH) for reception, via the receiver, of the MAC RAR until the timer has reached a maximum time limit, the maximum time limit corresponding to the extended time period.

25. The UE according to claim 24, wherein the MAC PDU comprises a MAC header including a Backoff Indicator subheader and wherein one or more fields of the Backoff Indicator subheader include said request.

26. The UE according to claim 25, wherein the Backoff Indicator subheader comprises at least one Reserved field and one or more of the Reserved fields of the Backoff Indicator subheader includes said request.

27. The UE according to claim 26, wherein the Backoff Indicator subheader comprises at least one Reserved field and wherein only one of the at least one Reserved field of the Backoff Indicator subheader includes said request.

28. The UE according to claim 27, wherein the Backoff Indicator subheader comprises two Reserved fields and wherein only one of the Reserved fields of the Backoff Indicator subheader includes said request.

29. The UE according to claim 28, wherein the Reserved field of the Backoff Indicator subheader is set to a value representing said request.

\* \* \* \* \*